United States Patent [19]
Abramat

[11] Patent Number: 5,332,384
[45] Date of Patent: Jul. 26, 1994

[54] BLOW MOLD GUIDE PIN AND ALIGNMENT DEVICE

[76] Inventor: Gerhard Abramat, 4232 Fern Hill Rd., Belvidere, Ill. 61008

[21] Appl. No.: 922,044

[22] Filed: Jul. 29, 1992

[51] Int. Cl.⁵ ............................................. B29C 49/56
[52] U.S. Cl. .................................. 425/522; 249/141; 425/450.1; 425/541
[58] Field of Search .................. 425/522, 541, 192 R, 425/595, 450.1, 451.9, 468, DIG. 10, 812; 249/141, 165; 164/397

[56] References Cited

U.S. PATENT DOCUMENTS

| | | | |
|---|---|---|---|
| 3,891,363 | 6/1975 | Sievers et al. | 249/141 X |
| 4,037,816 | 7/1977 | Scott | 249/165 X |
| 4,212,623 | 7/1980 | Allen | 249/141 X |
| 4,352,772 | 10/1982 | Bezner | 425/468 X |
| 4,561,626 | 12/1985 | Black | 425/541 X |
| 4,684,101 | 8/1987 | Wagner et al. | 425/193 X |
| 4,842,506 | 6/1989 | Coutier | 425/193 |
| 4,856,977 | 8/1989 | Von Holdt | 425/468 |
| 4,871,009 | 10/1989 | Volkmann | 164/243 |

Primary Examiner—Richard L. Chiesa
Attorney, Agent, or Firm—Fitch, Even, Tabin & Flannery

[57] ABSTRACT

An improved blow mold alignment system for aligning blow mold halves relative to one another. The system includes the alignment pins having a cylindrical tip section and conical following section on one blow mold half. Sockets for the pins are provided in a cooperating blow mold half. Each socket has a corresponding configuration for snugly engaging a pin in one end thereof and has an opposite open end which aligns with a channel created in the blow mold half. The channel terminates in an outlet formed in a wall of the mold half at a position subjacent that of the socket.

27 Claims, 2 Drawing Sheets

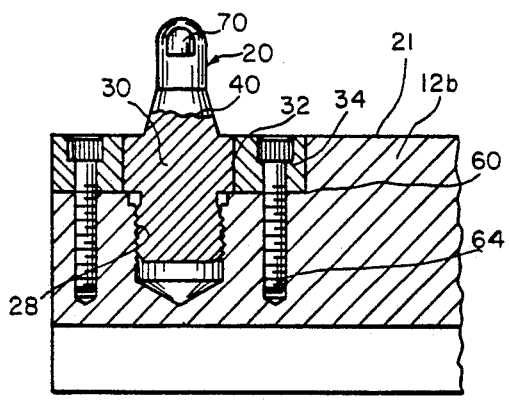
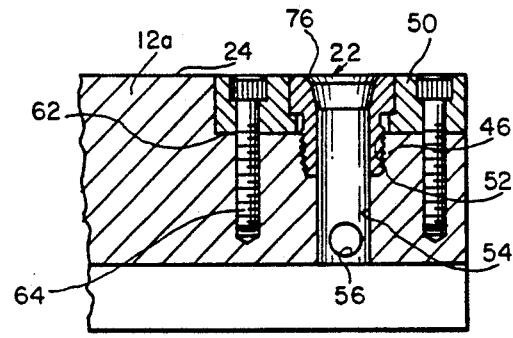
_Fig. 3_     _Fig. 4_
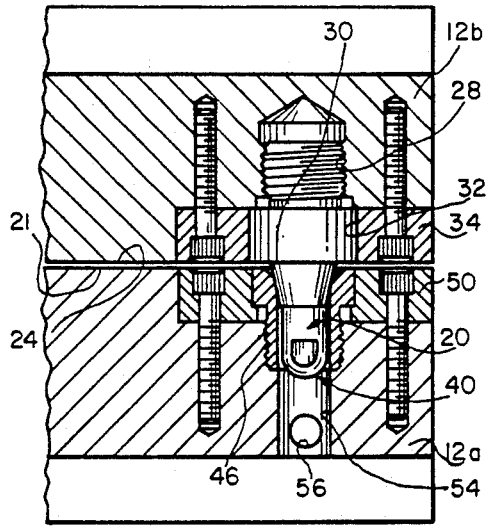
_Fig. 5_
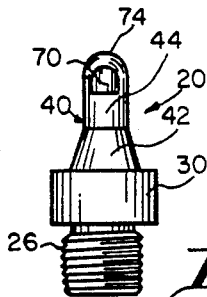
_Fig. 6_
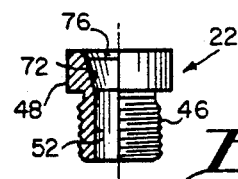
_Fig. 7_
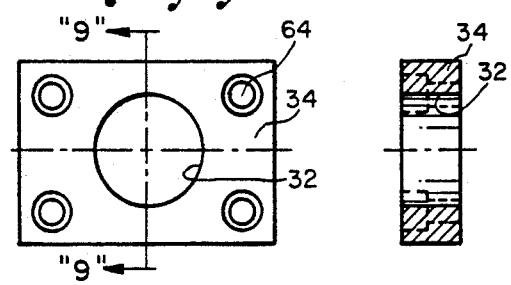
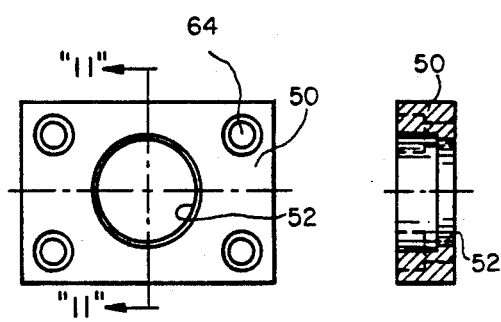
_Fig. 8_   _Fig. 9_   _Fig. 10_   _Fig. 11_

1

BLOW MOLD GUIDE PIN AND ALIGNMENT DEVICE

BACKGROUND OF THE INVENTION

1. Filed of the Invention

The present invention proposes an improved blow mold guide pin and alignment system. More particularly, the system includes uniquely configured alignment pins and coacting sockets for same, the sockets each including a drain bore by means of which any overflow plastic trapped therein can escape through gravitational effects.

2. Description of the Prior Art

Heretofore, various mold alignment systems have been proposed. An example of such alignment system can be found in the Volkmann U.S. Pat. Nos. 4,794,975 and 4,871,009 directed to an antishift assembly for mold matchboards. The assembly includes mating inserts, one of which has stem portions extending therefrom which engage within coacting bores in the other insert. Further, blind collecting areas for loose impression material are provided for insuring close fit of matching components.

Further, many mold alignment systems are known to comprise cylindrical pins in one mold half which engage within coacting cylindrical bores in the other mold half. The cylindrical configuration and the required close tolerances between the pins and bores create a significant amount of friction between these coacting elements, causing significant periods of down time to replace friction worn elements.

As will be described in greater detail hereinafter, the configuration of the alignment pins and sockets in the system of the present invention not only substantially increases the useful life of the system by significantly decreasing frictional wear, but also allows for evacuation of overflow from the system using the force of gravity.

SUMMARY OF THE INVENTION

According to the invention there is provided an improved blow mold alignment system for aligning blow mold halves relative to one another, the improvement comprising the provision of alignment pins having a cylindrical tip section and conical following section on one blow mold half and the provision of coacting sockets for the pins in a cooperating blow mold half, the sockets having a corresponding configuration for snugly engaging the pins in one end thereof and having an opposite open end which aligns with a channel created in the blow mold half, the channel terminating in an outlet formed in a wall of the mold half at a position subjacent that of the socket.

According to other features of the invention, there is provided an improved blow molding system aligning blow mold halves relative to one another, the improvement comprising the provision of alignment pins, each of the pins having a cylindrical tip section and a conical following base section on one blow mold half, and a corresponding socket for each of the pins in a cooperating one of the blow mold halves, the socket having a corresponding configuration for snugly engaging the pin in one end thereof and having an opposite open end which aligns with a channel provided in the blow mold half associated therewith, the channel terminating in an outlet formed in a wall of the socket bearing mold half at a position subjacent that of the socket for allowing drainage of mold refuse.

Yet other features of my invention relate to the conical follower section being angulated relative to the cylindrical tip in the range of 15 to 20 degrees.

BRIEF DESCRIPTION OF THE DRAWINGS

FIG. 3 is a cross sectional view through the mold section of FIG. 2 in an area incorporating one pin.

FIG. 4 is a cross sectional view through the mold section of FIG. 1 in an area incorporating one socket.

FIG. 5 is a cross sectional view through one engaged pin and socket showing the cooperative engagement therebetween.

FIG. 6 is a side view of an alignment pin made in accordance with the teachings of the present invention.

FIG. 7 is a side view of a coacting socket made in accordance with the teachings of the present invention, a portion of the socket being broken away to show the configuration of a pin receiving bore therein.

FIG. 8 is a top plan view of a pin engaging support block.

FIG. 9 is a cross sectional view through the block and is taken along line 9—9 of FIG. 8.

FIG. 10 is a top plan view of a socket engaging support block.

FIG. 11 is a cross section through the block and is taken along line 11—11 of FIG. 10.

DESCRIPTION OF THE PREFERRED EMBODIMENT

Figure 1:
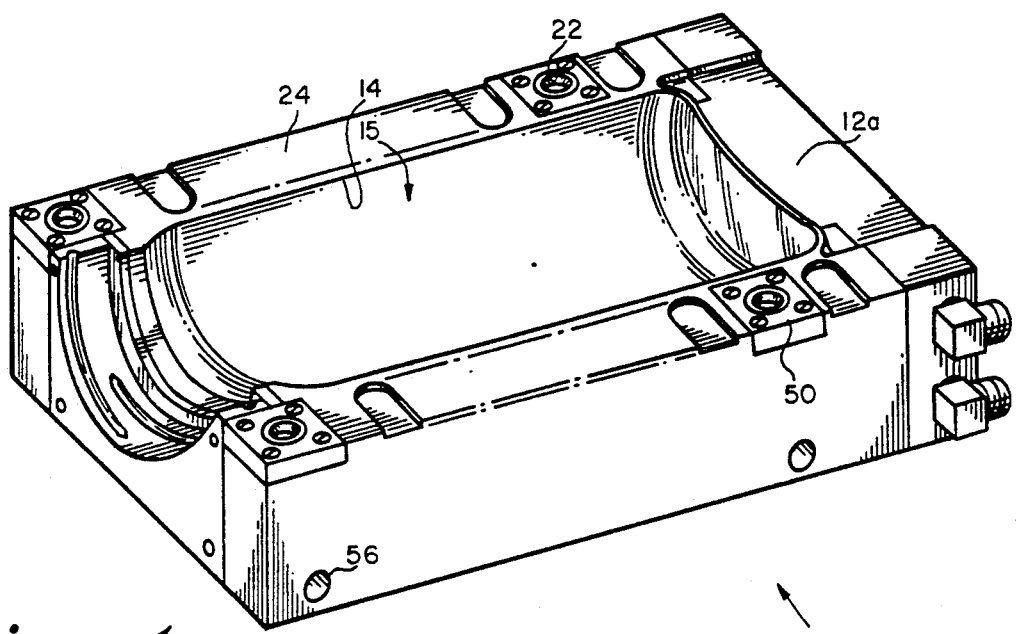
FIG. 1 is a perspective view of a first mold section or half including alignment sockets having drain bores therein and made in accordance with the teachings of the present invention.
Figure 2:
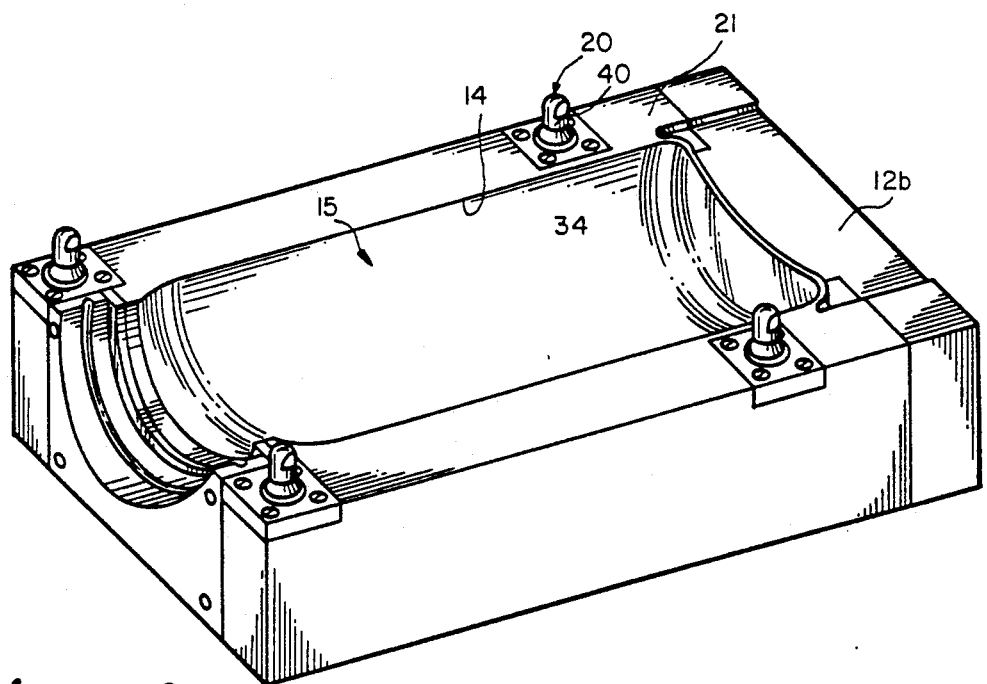
FIG. 2 is a perspective view of a second, coacting mold section or half having alignment pins therein which engage within corresponding ones of the sockets shown in FIG. 1, the pins also being made in accordance with the teachings of the present invention.

Referring now to the drawings in greater detail, there is illustrated therein the improved blow mold alignment system of the present invention generally identified by the reference numeral 10.

As is known, in blow molding, two cooperating mold sections 12a and 12b are brought together in a desired alignment, have a plastic or other material injected thereinto, with air being used to blow the plastic against walls 14 of a mold cavity 15 formed between the mold sections 12a and 12b.

It is obvious that alignment of the mold sections 12a and 12b is a critical parameter for creating a perfect product by blow molding techniques.

Thus, it is necessary to ensure a substantially perfect alignment between the mold sections 12a and 12b, such alignment being produced by the provision of an alignment system such as the subject system 10.

To date, such alignment system has in cooperated cylindrical pins on one mold section and cylindrical sockets on the opposite mold section within which the pins slidingly engage. It will be understood that the mold sections engage and disengage once for each article manufactured, creating significant frictional effects on the pins and sockets. Such friction causes significant periods of down time for replacement of the worn alignment members.

Accordingly, if the frictional effects are significantly decreased, useful life of the alignment members can be significantly increased and down time significantly decreased.

The improved alignment system 10 decreases the effects of friction as will now be described.

The system 10 incorporates pins 20 which are seated along an edge 21 of the mold section 12b, the pins 20 engaging within cooperating sockets 22 provided for same in an edge 24 of mold section 12a which abuts directly against edge 21 of mold section 12b when the sections 12a and 12b are engaged.

The pins 20 have a unique configuration which significantly reduces friction. In this respect, the pins 20 include a screw threaded base 26 which engages within a screw threaded hollow 28 provided in the mold section 12b. Adjacent the screw threaded base 26 is a base flange 30 which engages within an upwardly stepped in diameter bore 32 in a support block 34 for the pin 20. This base flange 30 fits snugly within the bore 32, so leakage around the base flange 30 of extraneous material is restricted.

Extending from the base flange 30, above the surface 21 of the mold half 12 is pin head 40.

As shown the pin head 40 incorporates two sections, a conical base section 42 and a chamfered cylindrical tip section 44.

Turning now to the socket 22, it will be seen that a screw threaded base 46 is also provided here. This screw threaded base 46 lies adjacent a base flange 48, the base flange 48 terminating at a top surface level of a support block 50 for the socket 22. The socket 22 has a throughbore 52 therein which aligns with a channel 54 provided in the mold section 12a, the channel 54 terminating in a side outlet port 56 in the mold section 12a.

Engagement and alignment of the mold sections 12a and 12b in use during molding is best shown in FIG. 5.

As illustrated, the mold section 12a incorporating the outlet channel 54 and port 56 is positioned beneath the mold section 12b incorporating the pin 20.

Thus, the channel 54 is downwardly disposed relative to the closed mold sections 12a and 12b and any overflow or seepage of plastic into the socket 22 is thus inherently placed directly under the effect of gravity.

In other words, if any leakage of plastic takes place between the mold sections 12a and 12b to a sufficient degree where the plastic enters the socket 22, the plastic does not interfere with engagement of the mold sections 12a and 12b together, the plastic, by means of gravity, merely enters the channel 54 in the mold section 12a and exits via the outlet 56.

It will be understood that the support blocks 34 and 50 are seated within recesses 60 and 62, respectively, in the mold sections 12b and 12a, respectively, and form a continuation of the mold surfaces 21 and 24, respectively, so as not to interfere with abutment of the surface 21 and 24 on the respective mold sections 12b and 12a.

The blocks 34 and 50 may be fixed to the mold sections 12b and 12a by any suitable means, such as by countersunk bolts 64. The blocks 34 and 50 can also be described as comprising wear plates. These blocks or plates are comprised of heat treated 440 stainless steel having a Rockwell hardness in the range 50-52 R. C. By manufacturing the locks or wear plates 34 and 50 from heat treated stainless steel the life of the molds can be extended for it enables the pins 20 and the sockets 22 to be replaced more easily with less wear and tear and maintenance.

FIGS. 8 and 9 are provided to show a chosen configuration for the support block 34 with the bore 32 therein extending straight through the entire thickness of the block 34.

The bore 52 in the other support block 50, on the other hand, is stepped to accommodate a slightly foreshortened base flange 48 on the socket 22.

It will be understood that the threaded engagements are created within the material of the mold sections 12a and 12b rather than within the material of the blocks 34 and 50 to ensure a secure engagement therebetween.

Turning back to the configuration of the pins 20 for a moment, it will be seen that the cylindrical tip section 44 of each pin 22 has opposite flats or chamfers 70 created thereon. These flats 70 are provided to enable an open ended wrench to turn the pin 20 and the threads 26 during engagement and disengagement of the pins 20 and in the sockets 22 with the threaded base 46.

From a review of the proposed configuration of the pins 20 and sockets 22 of the system 10, it will be understood that the configuration eliminates a significant proportion of the friction created between engaging members 20 and 22. In this respect, by providing the flats 70 along the cylindrical tip section 44 of the pin 20 while the socket 22 is maintained circular, friction in the most stressed area of the pin 20 is substantially decreased. Then, by creating the conical following base section 42 on the pin 22, friction therealong is virtually eliminated until the section 42 engages flush within the seat 72 for same in the socket 22.

Further, the tip section 44 has a rounded head 74 and the engaging or entry end 76 of the socket 22 is filleted to decrease initial contact friction.

For maximum decrease of friction relative to material and forming requirements for creating the system 10, it is proposed that the angulation of the conical base section 42 as it relates to the pin tip section 44, should be in the range of 15 to 20 degrees, and most desirably at 15 degrees. Further, excellent results are obtained when the outside diameter is between 0.690 and 0.850 inch.

As described above, the blow mold alignment system 10 of the present invention has a inner of advantages, some of which have been described above and others of which are inherent in the invention. Also, modifications may be proposed to the system 10 without departing from the teachings herein. Accordingly, the scope of the invention is only to be limited as necessitated by the accompanying claims.

I claim:

1. An improved blow mold alignment system for aligning blow mold halves relative to one another, having an alignment pin structure in combination with blow mold halves, the improvement of the alignment pin structure comprising alignment pins having a cylindrical tip section and conical following base section on one blow mold half and the provision of a corresponding socket for each pin in a cooperating blow mold half, said cylindrical tip section having a rounded head, said conical following base section is angulated relative to said cylindrical tip section, the socket having a corresponding configuration for snugly engaging said pin in one end thereof and having an opposite end which aligns with a channel located in the cooperating blow mold half, said channel terminating in an outlet formed in a wall of said cooperating mold half at a position subjacent that of the socket.

2. The system of claim 1 wherein opposite peripheral surface areas of said cylindrical tip section are flattened.

3. The system of claim 2 wherein said conical following base section is angulated relative to said cylindrical tip section in the range of 15 to 20 degrees.

4. The system of claim 3 wherein said angulation is at 15 degrees.

5. The system of claim 4 wherein said pin engaging end of said socket is filleted.

6. The system of claim 5 wherein said socket is threadedly engaged to said cooperating mold half.

7. The system of claim 6 wherein said pin is threadedly engaged to said one mold half.

8. The system of claim 7 wherein said pin extends upwardly from an abutment surface of said one mold half.

9. The system of claim 8 wherein said socket is countersunk within said cooperating mold half and terminates in a plane of an abutment surface thereof.

10. A system for aligning halves of a blow mold during creation of an abutting engagement therebetween, the system including alignment pins having a cylindrical tip section and conical following section on one blow mold half, the cylindrical tip section having a rounded head and the conical following section being angulated relative to the cylindrical tip section, and cooperating sockets for said pins in a cooperating blow mold half, the sockets each having a corresponding configuration for snugly engaging a corresponding pin in one end thereof and an open end extending outwardly of the cooperating blow mold half and the cooperating blow mold half having a channel therein aligning with the open end of each socket.

11. The system of claim 10 wherein opposite peripheral surface areas of said cylindrical tip section are flattened.

12. The system of claim 11 wherein said conical following section is angulated relative to said cylindrical tip section in the range of 15 to 20 degrees.

13. The system of claim 12 wherein said angulation is at 15 degrees.

14. The system of claim 13 wherein said pin engaging end of said socket is filleted.

15. The system of claim 14 wherein said socket is threadedly engaged to said cooperating mold half.

16. The system of claim 15 wherein said pin is threadedly engaged to said one mold half.

17. The system of claim 16 wherein said pin extends upwardly from an abutment surface of said one mold half.

18. The system of claim 17 wherein said socket is countersunk within said cooperating mold half and terminates in a plane of an abutment surface thereof.

19. The system of claim 18 wherein said socket includes a flange which seats within a support block for same which is engaged within said cooperating mold half.

20. The system of claim 19 wherein said pin includes a base flange which seats within a support block which is engaged within said one mold half.

21. The system of claim 20, wherein said support block is fixed to said one mold half by countersunk bolts.

22. An improved blow mold alignment system for aligning blow mold halves relative to one another, having an alignment pin structure in combination with blow mold halves, the improvement of the alignment pin structure comprising alignment pins, each of said pins having a cylindrical tip section and a conical following base section on one blow mold half, the cylindrical tip section having a rounded head and the conical following base section being angulated relative to the cylindrical tip section, and a corresponding socket for each of said pins in a cooperating one of said blow mold halves, the socket having a corresponding configuration for snugly engaging said pin in one end thereof and having an opposite open end which aligns with a channel provided in the cooperating blow mold half bearing said socket, said channel terminating in an outlet formed in a wall of said socket bearing blow mold half at a position subjacent that of the socket for allowing drainage of mold refuse.

23. The system of claim 22 wherein said cylindrical tip section has a rounded head, said conical following base section being angulated relative to said cylindrical tip section in the range of 15 to 20 degrees.

24. The system of claim 23 wherein said angulation is at 15 degrees.

25. The system of claim 24 wherein said pin engaging end of said socket is filleted.

26. The system of claim 22 wherein the outside diameter of each of said alignment pins is in the range of 0.690 to 0.850 inch.

27. The system of claim 22 wherein mold halves have support blocks, said pins and sockets being mounted in said support block, said support block being comprised of type 440 stainless which is heat treated having a Rockwell hardness in the range of 50-51 R. C.

* * * * *